(12) United States Patent
Find (10) Patent No.: US 11,287,183 B2
(45) Date of Patent: Mar. 29, 2022

(54) METHOD AND PLANT FOR THE PURIFICATION OF CARBON DIOXIDE USING LIQUID CARBON DIOXIDE

(71) Applicant: Union Engineering A/S, Fredericia (DK)

(72) Inventor: Rasmus Find, Vejle (DK)

(73) Assignee: UNION ENGINEEERING A/S, Fredericia (DK)

(*) Notice: Subject to any disclaimer, the term of this patent is extended or adjusted under 35 U.S.C. 154(b) by 0 days.

(21) Appl. No.: 15/496,644

(22) Filed: Apr. 25, 2017

(65) Prior Publication Data

US 2017/0227285 A1 Aug. 10, 2017

Related U.S. Application Data

(63) Continuation of application No. 13/703,660, filed as application No. PCT/DK2010/050146 on Jun. 17, 2010, now abandoned.

(51) Int. Cl.
*F25J 3/08* (2006.01)
*B01D 3/10* (2006.01)
(Continued)

(52) U.S. Cl.
CPC .................. *F25J 3/08* (2013.01); *B01D 1/28* (2013.01); *B01D 3/007* (2013.01); *B01D 3/106* (2013.01); *B01D 53/002* (2013.01); *B01D 53/1418* (2013.01); *B01D 53/1493* (2013.01); *F25J 3/0204* (2013.01); *B01D 2256/22* (2013.01); *B01D 2257/102* (2013.01); *B01D 2257/30* (2013.01); *B01D 2257/40* (2013.01); *B01D 2257/402* (2013.01); *B01D 2257/702* (2013.01); *B01D 2257/704* (2013.01);
(Continued)

(58) Field of Classification Search
CPC ........ F25J 3/0266; F25J 3/067; F25J 2210/18; F25J 2215/80
See application file for complete search history.

(56) References Cited

U.S. PATENT DOCUMENTS 3,417,572 A 12/1968 Pryor
4,124,496 A 11/1978 Cummings
(Continued)

FOREIGN PATENT DOCUMENTS

DE 102007056625 B3 9/2008
EP 1804956 A1 7/2007
(Continued)

OTHER PUBLICATIONS

Notice of the Result of Substantive Examination pursuant to Article 52 (1) of Patent Law No. 14/2001 issued in corresponding Indonesian Patent Application No. W00201300205, dated May 25, 2018, 4 pages.

*Primary Examiner* — Brian M King
(74) *Attorney, Agent, or Firm* — Husch Blackwell LLP (57) ABSTRACT

The present invention relates to an improved method for removing contaminants from a gaseous stream substantially comprising carbon dioxide. More specifically, the method comprises the step of subjecting the gaseous stream to an absorption step in which the absorbent is liquid carbon dioxide wherein the waste of carbon dioxide is minimized by utilizing a compressing means for generating a pressure difference between two streams in a reboiler.

17 Claims, 3 Drawing Sheets

(51) Int. Cl.
*B01D 1/28* (2006.01)
*B01D 53/14* (2006.01)
*B01D 3/00* (2006.01)
*B01D 53/00* (2006.01)
*F25J 3/02* (2006.01)

(52) U.S. Cl.
CPC ........ *F25J 2200/02* (2013.01); *F25J 2205/40* (2013.01); *F25J 2210/80* (2013.01); *F25J 2215/80* (2013.01); *F25J 2220/84* (2013.01); *F25J 2250/00* (2013.01); *Y02C 20/10* (2013.01); *Y02P 70/10* (2015.11)

(56) References Cited

U.S. PATENT DOCUMENTS

| | | | |
|---|---|---|---|
| 4,525,244 A * | 6/1985 | Gourlia | C10G 7/02 159/24.2 |
| 4,591,370 A * | 5/1986 | Gazzi | B01D 53/1456 62/635 |
| 4,717,408 A | 1/1988 | Hopewell | |
| 4,854,955 A * | 8/1989 | Campbell | F25J 3/0209 62/621 |
| 4,861,360 A * | 8/1989 | Apffel | F25J 3/0209 62/625 |
| 6,461,413 B1 * | 10/2002 | Landreau | B01D 53/263 95/161 |
| 2005/0287056 A1 * | 12/2005 | Baker | B01D 53/1487 423/242.1 |
| 2007/0107465 A1 * | 5/2007 | Turner | F25J 1/0022 62/613 |
| 2007/0231244 A1 * | 10/2007 | Shah | F25J 3/0209 423/437.1 |
| 2010/0024476 A1 | 2/2010 | Shah | |

FOREIGN PATENT DOCUMENTS

| | | |
|---|---|---|
| EP | 1907319 B1 | 1/2010 |
| EP | 2582445 B1 | 10/2015 |
| GB | 877091 | 9/1961 |
| GB | 2059787 A | 4/1981 |
| WO | 2007009461 A2 | 1/2007 |
| WO | 2009127217 A1 | 10/2009 |
| WO | 20100006934 A2 | 1/2010 |

* cited by examiner

METHOD AND PLANT FOR THE PURIFICATION OF CARBON DIOXIDE USING LIQUID CARBON DIOXIDE

The instant application is a continuation of and claims priority to co-pending U.S. patent application Ser. No. 13/703,660, having a § 371 date of Mar. 7, 2013, which is a National Stage application of and claims priority benefit to PCT/DK2010/050146, filed on Jun. 17, 2010. The aforementioned patent applications are incorporated by reference in their entireties herein.

The present invention relates to an improved method for removing contaminants from a stream substantially comprising carbon dioxide. More specifically, the method comprises the step of subjecting the stream to a purification step in which liquid carbon dioxide is used and wherein the waste of carbon dioxide is minimized by generating a pressure difference between two streams in a reboiler.

BACKGROUND OF THE INVENTION

Carbon dioxide recovery plants are widely used to clean and/or recover carbon dioxide released e.g. from combustion of hydrocarbons, fermentation and gas processing.

When producing food grade carbon dioxide or carbon dioxide for other applications, where a high purity is required, contaminants must be removed in up and/or down stream equipment in order to obtain the required purity. Conventional technologies available for removing such contaminants include for example scrubbing, oxidation, adsorption and/or distillation. Also, the introduction of a flash column step between an absorber and a stripper has been reported e.g. in WO 2007/009461 in which $NO_2$ is removed in a flash column located between an amine absorber and a stripper. $NO_2$ is difficult to separate further down stream in the purification process where the carbon dioxide is in liquid form, since $NO_2$ is almost irreversibly dissolved therein.

Another purification step is water scrubbing; in a water scrubber all water-soluble contaminants are removed from the gaseous source. The drawbacks of using a water scrubber is the large amounts of clean water used and wastewater formed.

Another purification step for a carbon dioxide containing gas is dehydration. In a dehydration step any water present in the gas is absorbed and thereby removed from the gaseous stream. Also, if any residues of acetaldehyde, volatiles and/or oxygenates are present in the gas, some of these compounds are also removed in a desiccant, depending on the dehydrator used.

However, if the gas comprises impurities, which are heavily dissolved in carbon dioxide, i.e. primarily non-polar organic compounds and compounds having a boiling point higher than the boiling point of carbon dioxide under the prevailing conditions, these will not be effectively removed from the stream using a water scrubber. For these compounds an adsorption filter, e.g. activated carbon, must be used.

This problem has been addressed in PCT/DK2009/050159 where pure liquid carbon dioxide is used to remove the above-mentioned impurities. This method has the drawback that when most of the impurities have a boiling point above the boiling point of carbon dioxide at the prevailing conditions, the amount of pure liquid carbon dioxide has to be increased in order to remove all impurities effectively. Increasing the absorbent liquid carbon dioxide, results in a huge loss of product carbon dioxide, which makes the method uneconomical.

Thus, as the yield of carbon dioxide is very important, measures must be taken in order to recover the carbon dioxide. In the prior art the contaminant rich liquid carbon dioxide that would otherwise be wasted was reboiled and fed to the feed stream again for purification. However, such prior art measures requires large amount of energy to be supplied to the process, which renders the process less economic, and in particular for streams substantially comprising contaminants having a boiling point above the boiling point of carbon dioxide. In addition, the energy consumption increases with increasing amounts of liquid carbon dioxide used, therefore one of the objects of the prior art was to keep the liquid carbon dioxide and energy consumption at a minimum without compromising the quality of the recovered carbon dioxide The object of the present invention is to provide a method and plant in which all of the above problems have been solved in an improved.

SUMMARY OF THE INVENTION

In one aspect, the present invention relates to a method for removing at least one contaminant from a gaseous feed stream substantially comprising carbon dioxide, said method comprising the step of subjecting the feed stream to a purification step under conditions providing a carbon dioxide enriched gaseous stream and a contaminant rich liquid stream.

This problem is in its broadest sense solved by purifying a feed stream in a purification column providing at least a contaminant rich liquid stream and a contaminant lean gaseous stream and reboiling the contaminant rich liquid stream providing a gaseous stream and feeding the gaseous stream to the purification column, wherein a pressure difference between the contaminant rich liquid stream and the contaminant lean gaseous stream is provided before the streams enter the reboiler wherein $$P_{contaminant\ rich\ liquid\ stream} < P_{contaminant\ lean\ gaseous\ stream}.$$

The above mentioned problems are in a more specific embodiment solved by a method comprising the step of subjecting a feed stream (f) to a purification step in a column having a top, bottom and an intermediate section, the purification step provides a contaminant lean gaseous stream (g2) leaving the top section of the column and a contaminant rich liquid stream (l2) leaving, optionally the bottom section of, the column and wherein the contaminant lean gaseous stream (g2) leaving the top section of the column is further subjected to the steps selected from:

1:
b1) compressing the contaminant lean gaseous stream (g2) providing a compressed gaseous stream (g4);
c1) cooling the compressed gaseous stream (g4) in a reboiler providing at least a product stream (p) and a gaseous stream (g3); and
d1) feeding the gaseous stream (g3) to the purification column at the bottom section of the column;
or
2:
b2) cooling the contaminant lean gaseous stream (g2) in a reboiler providing at least a product stream (p) and a gaseous stream (g3); and
c2) compressing the gaseous stream (g3) providing a cooled compressed gaseous stream (g4');

d2) feeding the cooled compressed gaseous stream (g4') to the column at the bottom section of the column; and depressurizing the contaminant rich liquid stream (l2) leaving at the bottom section of the column before entering the reboiler.

The depressurization is in a particular embodiment obtained by means of a valve.

The present inventors have found that by circulating the contaminant lean carbon dioxide stream and compressing and utilizing the energy for re-evaporating the contaminant rich liquid carbon dioxide in the reboiler, very large amounts of liquid carbon dioxide can be reboiled without the consumption of large amounts of externally supplied energy.

This is due to the fact that when the pressure is increased by 1 bar—the corresponding saturation temperature of carbon dioxide will increase approximately 3 K (° C.) and vice versa. In this way a temperature difference can be obtained allowing a heat exchange between hot and cold streams. Thus, what the inventors have realized is that by the solution of the invention a sufficient temperature differences can be obtained between the two streams for recovering carbon dioxide from the contaminant rich stream in a more economical way than by using an external heat source in the reboiler.

The present invention has several advantages. By increasing the amount of liquid carbon dioxide used as absorbent, the feed stream will be recovered at a much higher degree of purity. By the solution provided the increasing amount of liquid carbon dioxide used does not compromise the overall economy of the method, i.e. the yield and energy consumption.

The prior art method according to PCT/DK2009/050159, in which the object was to minimize the amount of carbon dioxide in the waste stream, showed that after a certain amount of absorbent liquid carbon dioxide (above 400 kg/hour) washing out of contaminants occurred. When increasing the amount of absorbent liquid carbon dioxide, more and more amounts and types of contaminants were washed out in a non-linear manner—meaning that no linear relationship exists between the volume of absorbent used and the degree of purification obtained.

However, the amount of wasted carbon dioxide also increases dramatically resulting in huge amounts of carbon dioxide to be reboiled and purified again (see the comparative example). Though this results in pure carbon dioxide the over all process becomes uneconomical because of either the high waste of carbon dioxide or the large amount of energy that must be supplied to the reboiler, and the subsequent cooling of the product stream, in order to recover the liquid carbon dioxide comprising contaminants.

In the reboiler the present invention utilizes the differences in pressure between the liquid stream entering the reboiler (i.e. l2) and the gas entering the reboiler (i.e. g2 or g4, depending on the embodiment). This difference in pressure is provided by the compressing means or the compressing means and the valve.

In its broadest sense the effect can be obtained by two alternatives either by (1) inserting the compression step on the contaminant lean gaseous stream, or (2) inserting the compression step on the gaseous stream effluent from the reboiler combined with a depressurization step before the contaminant rich liquid enters the reboiler. The depressurization is in this embodiment preferably performed by inserting a valve.

The liquid before the valve has a pressure $p_1$ which is higher than the pressure $p_2$ of the liquid having passed the valve. Similarly applies to the gas entering the compressor where the gas entering the compressor has the pressure $p_2$ and the gas leaving the compressor has the pressure $p_1$, which is higher. The difference in pressure, whether the stream is liquid or gaseous, is the same.

Providing for this difference in pressure on these specific streams of the process has the important effect of changing the dew point and bubble point of the streams. This effect renders very high levels of absorbent liquid dioxide relative to feed stream economical. In fact using this method any amount of absorbent liquid carbon dioxide can be used without rendering the process uneconomical.

Thus, the energy contained in the purified gaseous carbon dioxide stream is utilized to recover otherwise wasted carbon dioxide with only little supply of external energy.

The feed stream may be both liquid and gaseous. When the feed stream is liquid, the method preferably comprises the steps b1) compressing the contaminant lean stream (g2) providing a compressed gaseous stream (g4); c1) cooling the compressed gaseous stream (g4) in a reboiler providing at least a product stream (p) and a gaseous stream (g3); and d1) feeding the gaseous stream (g3) to the column at the bottom section of the column (alternative 1).

When the feed stream is gaseous both embodiments are advantageous, however particularly preferred is the method comprising the steps b2) cooling the contaminant lean stream (g2) in a reboiler providing at least a product stream (p) and a gaseous stream (g3); and c2) compressing the gaseous stream (g3) providing a cooled compressed gaseous stream (g4'); d2) feeding the cooled compressed gaseous stream (g4') to the column at the bottom section of the column; and depressurizing the contaminant rich liquid stream (l2) leaving at the bottom section of the column before entering the reboiler (alternative 2).

When the compressor is placed after the reboiler, the duty required is smaller as compared to the duty required in alternative 1; therefore a smaller compressing means can be used. Moreover, it is possible to use, e.g. an oil lubricated compressor, which is a less costly alternative. Trace amounts of oil in the gaseous stream caused by this compressor is immediately removed in the purification column. Thus, this alternative saves cost on both construction of the plant and the subsequent operation.

Depending on the nature of the feed stream the purification step will either be an absorption or a rectification process. Thus, when the feeding stream is liquid the purification step is a rectification and when the feeding stream is gaseous the purification step is an absorption process.

In a particular embodiment where the feed stream (f) is essentially liquid the compression step d) is performed according to alternative 1. When the feed stream is liquid the embodiment of alternative 2 will be less efficient, as the contaminant rich liquid stream (l2) leaving the bottom section of the column will be very low consequently the pressure difference provided by the valve on that stream will have a minimal effect.

However, when the feed stream (f) is gaseous the compression step d) can be equally performed according alternative 1 and 2, however in an even more preferred embodiment according to alternative 2. This is due to the lower cost of construction and the reduced amount of energy used to compress the smaller volume of the gaseous stream (g3) as compared to the contaminant lean gaseous stream (g2).

The pressure in the column is normally between 10 and 40 bar, however, other pressures are contemplated, for example if the temperature of the liquid absorbent carbon dioxide is higher than the freezing temperature of water and hydrates, such as gas and liquid hydrates, under the prevailing pressure, the carbon dioxide would also be able to remove water from the stream.

Under the above pressure conditions, a preferred temperature range of the gaseous feed stream is 5 to 25° C., more preferred 5 to 15° C., such as 10° C., although temperatures in the range of −40 to 40° C. are contemplated if operating at another pressure.

The dew point temperature of carbon dioxide in the above mentioned pressure range is −40 to +5.5° C.; it is within the skill of the art to determine the dew point temperature of carbon dioxide at any given pressure.

The method of the present invention is particularly useful for removing contaminants having a boiling point higher than the boiling point of carbon dioxide at the prevailing conditions and/or non-polar compounds. These compounds are not effectively removed by other high through put methods. Such compounds may be but are not restricted to sulfides, such as hydrogen sulfide, carbonyl sulfides and dimethylsulfide; nitrogen containing compounds, such as $N_2$, ammonia and nitrogen dioxide; and hydrocarbons, such as, methane, n-pentane, n-hexane, benzene, toluene and oxygen containing hydrocarbons such as dimethyl ether, acetaldehyde, ethyl acetate, acetone, methanol, ethanol, isobutanol and n-propanol. The method provides a carbon dioxide enriched gaseous stream and a contaminant enriched liquid stream comprising at least 95% (w/w) of each of the at least one contaminant(s) specified above as compared to the content in the feed stream.

In a particular embodiment, the absorbent liquid carbon dioxide is an externally supplied source of liquid carbon dioxide, particularly preferred partially a stream from the down stream carbon dioxide purification process. The carbon dioxide stream may in this embodiment be distilled liquid carbon dioxide or condensed carbon dioxide.

The advantage of this embodiment is that the absorbent, which is used in the column, has a high purity; consequently, there will be no accumulation of impurities in the gaseous phase above the purification column. Moreover, the carbon dioxide of higher purity will have improved absorbing properties. This is particularly advantageous in facilities where a potential build up of contaminants occur frequently, even when contaminants are present in smaller amounts. An external supplemental supply of absorbent liquid carbon dioxide is often necessary in the present invention when the volume of absorbent liquid carbon dioxide by far exceeds the volume of the feed stream.

Also, when operating at very high absorbent rates, e.g. higher than the actual capacity rate of the plant, externally supplied carbon dioxide may be necessary.

In a presently preferred embodiment the ratio of absorbent liquid carbon dioxide to feed stream is 1:3 to 10:1, preferably 1:3 to 3:1 such as 1:2, 1:1, 2:1, 3:1, 4:1, 5:1, 6:1, 7:1, 8:1 and 9:1. Depending on the impurity profile the ratio may be in the lower end, such as a ratio of 1:1 to 5:1 also provided in PCT/DK2009/050159.

In another embodiment is provided a method for removing the at least one contaminant from the feed stream wherein the purification step comprises an integrated dehydration step, i.e. an integrated chemical or physical drying step, respectively.

In the dehydration integrated embodiment, the feed stream comprising water is contacted with an agent capable of decreasing the water activity (a water inhibitor, a dehydrating agent), herein after "the water inhibitor". Such a water inhibitor is preferably fed in the purification column at a location between the mid section of the purification column and above the inlet of the feed stream, when the feed stream is gaseous; in this context mid-section should be understood as being "mid" relative to the height of the column, i.e. the centre part of the intermediate section. As mentioned, the temperature at the bottom of the column will be adjusted so that water does not freeze under the prevailing conditions. However, once being mixed with the water inhibitor, the freezing point of water is significantly reduced why the temperature is no longer as critical. Alternatively the water inhibitor may be fed at the same position as the feed stream or together with the feed stream, depending on the temperature of the feed stream.

The term water inhibitor contemplates any agent capable of decreasing the water activity/inhibit water and may be selected from the group consisting of methanol, ethanol, mono ethylene glycol and tri ethylene glycol. Methanol and ethanol are particularly preferred. Due to the low temperature in the purification column, it is desired to select a water inhibitor that has a low viscosity under the prevailing conditions. Furthermore, it is desired to choose water inhibitors that are relatively inexpensive and easy to recover; recovery of the water inhibitor, e.g. methanol and ethanol is within the skill of the art. Ethanol may be preferred, if the process is implemented in a bio-ethanol plant or a similar plant in which fermentation takes place i.e. where the water inhibitor, ethanol, is present in the facility so that no external supply of water inhibitor is needed; thus, the water inhibitor is in a particular preferred embodiment bio-ethanol.

In particular the feed stream may comprise ethanol when originating from a bio-ethanol production plant or a fermentation process. In this embodiment the feed stream may comprise sufficient ethanol to dehydrate the feed stream in the purification column alternatively; additional ethanol/water inhibitor may be added.

In yet another embodiment the water is removed by means of a water scavenger, such as ammonia.

When having an integrated dehydration step saving of space is even more improved as an upstream-located dehydration step, often employed, may now be omitted. In addition, the dehydration is more flexible as the flow of inhibitor may be adjusted depending on the content of water in a stream to be purified.

The absorbed water and water inhibitor/scavenger is preferably drawn from the purification column at the bottom section of the column along with the contaminant rich liquid stream.

In this embodiment, the contaminant rich liquid stream may also leave the column at a point higher than/above the inlet of the water inhibitor/scavenger into the column, e.g. between the water inhibitor/scavenger inlet and the mid-section of the column, in order to obtain a water inhibitor/scavenger lean carbon dioxide fraction that may be returned to the purification column after an evaporation step, e.g. in the reboiler.

In yet another embodiment a fraction of the contaminant rich liquid stream comprising the water inhibitor/scavenger and absorbed impurities is circulated in a loop. In this embodiment the contaminant rich liquid stream leaving at the bottom section of the purification column is split in two so that a first contaminant rich liquid fraction of the liquid stream (12a) is recirculated to the inlet of pure water inhibitor/scavenger and mixed therewith. This saves consumption of water inhibitor/scavenger in the over all process by exploiting the full ability of the water inhibitor/scavenger to bind water.

In a typical process according to the present invention, the water content is relatively low as compared to the capability of any of the above mentioned water inhibitors/scavengers to absorb water; therefore looping the water inhibitor/scavenger so that the water in the feed stream is inhibited by the water inhibitor/scavenger mixed with water, carbon dioxide and impurities as defined in the context of the present invention, will not impair the water inhibiting ability. Rather the ability of the water inhibitor/scavenger to bind water is fully exploited.

It is also contemplated that all of the above embodiments may be combined, i.e. that both an intermediate outlet for liquid carbon dioxide in the upper part of the purification column, and/or a loop of waste liquid and/or a split loop of waste liquid may be present.

If the feeding gas comprises $O_2$, NO and $NO_2$, $NO_2$ could also be absorbed in the liquid $CO_2$. This would force the gas phase equilibrium $½O_2+NO<->NO_2$ to the right. Consequently, substantial amounts of the NOx's would be removed from the stream as $NO_2$ in the liquid $CO_2$ leaving at the bottom of the purification column. As mentioned, $NO_2$ favours liquid carbon dioxide; once substantially pure liquid carbon dioxide is obtained $NO_2$ is very difficult to separate off. By introducing the carbon dioxide scrubber/rectifier, i.e. the purification column, gaseous streams comprising trace amounts of NOx's are additionally removed there from.

As the methods of the present invention is to be performed in an operating unit located within a larger unit, the methods are in a particular embodiment followed by processing the product gaseous carbon dioxide leaving the column and reboiler by optionally heat exchange, optionally filtration, such as using an activated carbon filter, and finally distillation, e.g. flash distillation or condensation, in order to give a pure liquid carbon dioxide product to be stored and sold. It is also contemplated that the method of the invention is performed in two or more consecutive purification steps, such as 2, 3 or 4. Consequently, it is also contemplated that more than one purification unit of the invention are interconnected.

The method of the present invention also contemplates the product carbon dioxide directly obtained after purification using the claimed methods.

Likewise it is contemplated that upstream purification steps may be present, such as a condensation step in which a carbon dioxide rich gas and liquid is obtained followed by the absorption step according to the present invention.

In yet another aspect the present invention provides a carbon dioxide purification unit. This unit is particularly useful for operating the method of the present invention.

Thus, in the second aspect is provided a carbon dioxide purification unit comprising a purification column (A1) having a top and a bottom and a section intermediate of the top and the bottom, the purification column having a feeding stream influent (f), a contaminant lean gas purification column effluent (g2) situated at the top part of the column, a liquid carbon dioxide influent (l1) situated at the top part of the column, and a contaminant rich liquid column effluent (l2) situated at the bottom part of the purification column, wherein the contaminant rich liquid effluent (l2) is connected to a reboiler (A3) additionally having a waste liquid effluent (l3), a product effluent (p), a compressed gaseous influent (g4), and a gas effluent (g3), the gaseous effluent (g3) being connected to the purification column (A1), wherein a compressing means (A2) is inserted between the reboiler (A3) and the purification column (A1) at a position between the contaminant lean gaseous purification column effluent (g2) and the compressed gaseous influent (g4); or wherein the contaminant rich liquid effluent (l2) is connected to a reboiler (A3) additionally having a waste liquid effluent (l3), a product effluent (p), a contaminant lean gas purification column effluent (g2), and a gas effluent (g3), the gas effluent (g3) being connected to a compressing means (A2) inserted between the reboiler (A3) and the purification column (A1) at a position between the gas effluent (g3) and a cooled compressed gaseous influent (g4') and wherein a valve (A4) is positioned between the contaminant rich liquid effluent and the reboiler (A3).

The purification column may be an absorption or rectification column known in the art, which is suitable for the particular purpose. The nature of the purification column depends on whether the feeding gas is liquid or gaseous. When the feeding stream is gaseous the process in the purification column is an absorption process and when the feeding stream is liquid the process in the purification column is a rectification.

Size and dimensions vary depending on the size of the carbon dioxide purification plant. The choice of purification column is within the skill of the art. Pipes, pumps, valves etc. are also included and the specific choice of and location of such additional elements is within the skill of the art. The intermediate section may be a packed section or if a tray type column, trays.

In one embodiment the feeding influent is situated at the top section of the purification column. In this embodiment the feeding stream is liquid and the contaminant rich liquid effluent is connected to a reboiler additionally having a waste liquid effluent, a product effluent, a contaminant lean gas influent, and a gas effluent, the gas effluent being connected to the purification column, wherein a compressing means is inserted between the reboiler and the purification column at a position between the cooled compressed gas purification column effluent and the contaminant lean gaseous influent.

When the feeding stream is gaseous the feeding influent is situated at the bottom section of the purification column. The position of the reboiler and compressor can be both alternatives provided by the invention.

In a particular embodiment, the contaminant rich liquid effluent (l2) situated at the bottom of the column is split in two at a position outside the column and a first contaminant rich liquid effluent (l2') is fed to a water inhibitor and/or scavenger influent (l0), and a second contaminant rich liquid effluent (l2") is disposed.

This set-up provides for recycling of the water inhibitor and/or scavenger. The branching of the pipe allows the stream to proceed in two ways. A valve may control the flows in either direction.

In another particular embodiment, the purification column is further provided with a carbon dioxide effluent (l5) situated at a position between the water inhibitor and/or scavenger influent (l0) and the liquid carbon dioxide influent (l1).

If an effluent is positioned above the inlet where the water inhibitor and/or scavenger is fed to the purification column, liquid carbon dioxide, essentially without water inhibitor and/or scavenger may exit the column for further purification, e.g. being recycled to the purification column.

In yet another embodiment, in which the purification unit is connected to the respective up and downstream operating units the feeding gas influent (g1) is connected to a feeding gas source, preferably partially purified carbon dioxide; and/or the product effluent (p) is connected to a carbon dioxide processing unit, such as a heat exchanger and/or a filter and/or a distillation column; and/or the liquid carbon dioxide influent (l1) is connected to a liquid carbon dioxide reservoir, e.g. the distillation column connected to the product effluent; and/or the waste liquid effluent (13) is connected to a waste reservoir and/or the water inhibitor and/or scavenger influent; and/or the water inhibitor and/or scavenger liquid influent (10) is connected to a water inhibitor and/or scavenger reservoir.

In still another embodiment, the carbon dioxide effluent (15) is connected to a carbon dioxide purification unit, such as the purification column (A1). This embodiment reduces the amount of liquid carbon dioxide that may be mixed with the water inhibitor and/or scavenger. As it may be difficult to remove the water inhibitor and/or scavenger from the waste liquid stream, this will be of importance if substantial amounts of carbon dioxide are present in the waste liquid.

DETAILED DESCRIPTION OF THE INVENTION

According to the present invention, a substantially pure $CO_2$ stream and/or feed stream comprises more than 80 weight-% $CO_2$.

Throughout the description, unless otherwise indicated, all contents are given as weight-%.

Throughout the description and claims the reference numerals are the same when referring to a stream (for methods) and influent/effluent (for purification units). Each stream assigned the same reference will have the same prefix and then being denoted stream or influent/effluent respectively depending on the context.

It is contemplated that all embodiments and variations of the method and purification unit apply equally to both said method and unit.

Thus, when referring to the method the suffix applied is "stream" when referring to the purification unit the suffix "influent/effluent" is applied. It is contemplated that streams/influents/effluents having the same prefix correspond, this is further detailed below.

Streams and Influents/Effluents

Feed stream (f); Product stream (p); Contaminant lean gaseous stream (g2); Gaseous stream (g3); Second gaseous stream (g3a); Compressed gaseous stream (g4); Cooled compressed gaseous stream (g4'); Filtered gas stream (g5); Non-condensable gases (g6); Water inhibitor and/or scavenger stream (10); Liquid carbon dioxide stream (11); Contaminant rich liquid stream (12); First contaminant rich liquid stream (12a); Second contaminant rich liquid stream (12"); Waste liquid stream (13); Second waste liquid stream (13a); Split second liquid stream (13b) Carbon dioxide stream (15); Condensed/distilled liquid carbon dioxide (16).

Components

Purification column (A1); Compression means (A2); Reboiler (A3); Valve (A4); condenser (A5); Filter (A6); Condenser/distillation column (A7); Pump (A8); Heat exchanger (A9).

Throughout the description and the claims the terms impurity and contaminant may be used interchangeably having the same meaning in the context of the present invention and both cover undesired substances in a carbon dioxide stream that should be removed.

Throughout the description and the claims the terms water activity reducing agent, agent and water inhibitor and/or scavenger may be used interchangeably having the same meaning in the context of the present invention, and all cover a substance that is capable of removing water from a carbon dioxide stream.

Throughout the description and the claims the term water free or dry gaseous stream is a gaseous stream in which the water content is so low so as not to cause process related problems, such as freezing within pipes, containers etc. More specifically a water free or dry gaseous stream may be defined as a stream wherein the dew point temperature of water under the prevailing process conditions is lower than the temperature of the stream.

The purification process described in greater details below typically takes place in a traditional column of the absorber, scrubber or rectification type. The specific choice of column depends on the size of the facility, the nature of the feed stream and other factors; this is within the skill of the art.

All illustrations appended to the present description should be understood as a section of a larger facility. All features and variants of each of the embodiments and aspects described herein apply equally to all embodiments and aspects, i.e. both the method and the plant.

The method of the present invention can be applied in any carbon dioxide recovery process at a point where the pressure of the feed gas is higher than the triple point pressure of carbon dioxide. Thus, preferably the method is used on a feed gas having a high carbon dioxide content.

The method can be applied to but is not limited to streams originating from a flue gas, a fermentation gas, petrochemical combustion gases and carbon dioxide from natural sources.

If the gaseous source is a flue gas the method of the present invention will typically be preceded by an amine absorption step optionally followed by flash distillation, and stripping as described in EP 1 907 319 B 1. Alternatively, the flue gas is condensed and subsequently absorbed in a physical absorbing agent as described in EP 1804956 A.

In applications where the source gas is from a natural source, a fermentation process or a petrochemical process, the method of the present invention will typically be preceded by compression and optionally drying. The applications described above are examples and the invention should not be limited to these specific applications.

Detailed descriptions based of the drawings apply equally to the method and purification unit of the present invention.

Figure 1:
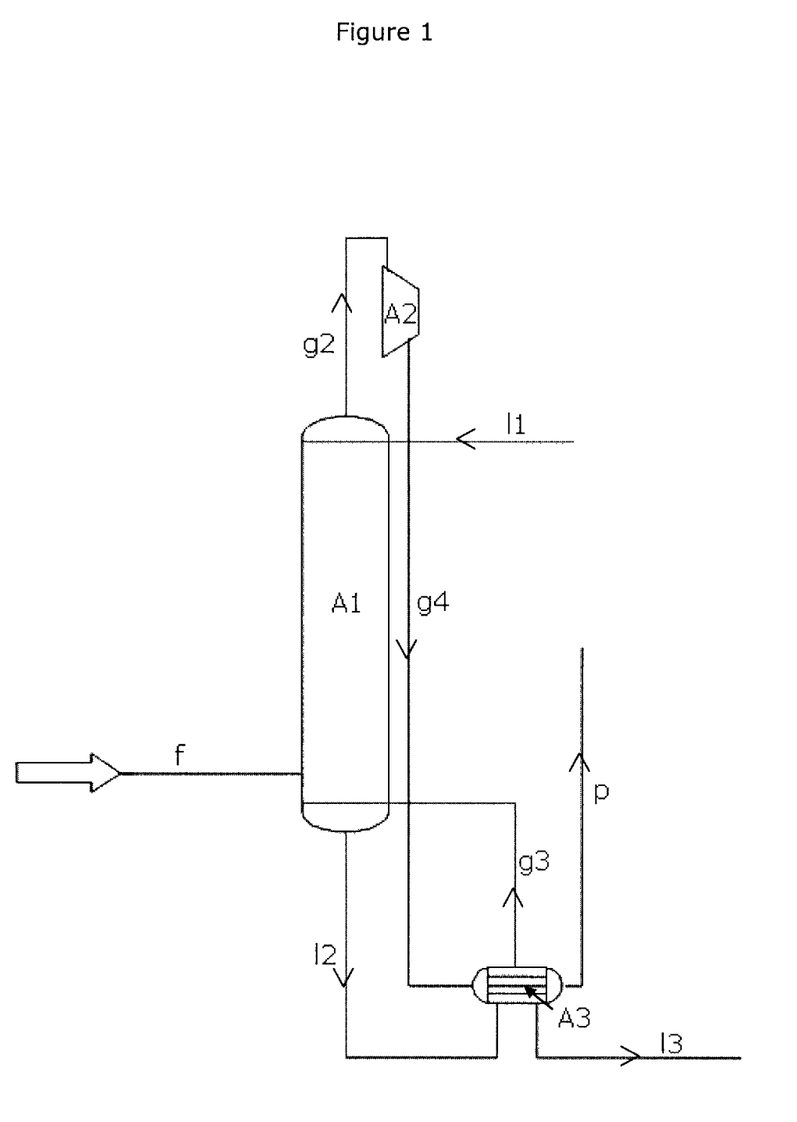
FIG. 1 is a flow chart embodying the method of the invention where the compression step/means is positioned according to alternative 1.

Referring now to FIG. 1, an embodiment of the present invention is illustrated in which a feed stream f may be liquid or gaseous, with the proviso that the inlet is situated at the top section of the purification column when the feed stream is liquid.

In FIG. 1 is shown a purification column A1, a compression means A2 and a reboiler A3.

The streams shown are the feed stream f, a liquid carbon dioxide stream 11, a contaminant lean gas stream g2 leaving at the top of the purification column, a contaminant rich liquid stream 12 leaving at the bottom of the purification column, a compressed gaseous stream g4 leaving the compressing means, a gaseous stream g3 leaving the reboiler, a waste liquid stream 13 leaving the reboiler, and a product stream p, leaving the reboiler.

The interaction of streams in the reboiler is as follows: The colder contaminant rich liquid stream 12 enters the reboiler in which it is heated by the warmer compressed gaseous stream g4. After the heat exchange, the contaminant rich liquid stream 12 turns into the gaseous stream g3 and the waste liquid stream 13 (i.e. the portion of 12 that is not re-evaporated). The warmer compressed gaseous stream g4 becomes the product stream p, which may be liquid, gaseous or both.

Hence, 12 is the contaminant rich liquid carbon dioxide stream comprising the absorbed/washed/scrubbed out contaminants. The contaminant rich stream 12 is fed to the reboiler A3 where it is reboiled providing the gaseous stream g3 and the waste liquid 13, which is optionally discarded. The contaminant lean gaseous stream g2 is compressed by means of a compressor or blower providing the compressed gas g4, which is fed to the reboiler A3.

The product stream p may be both gaseous, liquid and a mixture depending on the conditions. The product stream may be further purified as desired for example by, but not limited to, heat exchanging and flash distillation and/or condensation to provide high purity liquid carbon dioxide to be stored in a tank or used directly. This high purity liquid dioxide directly obtained by any of the methods is also contemplated.

Before entering the purification column A1, the feed stream f may be passed through a filter and/or a heat exchanger in order to condition the feed stream f for entering the purification column. The feed stream f may be both gaseous and/or liquid, thus the preconditioning depends on whether a gaseous and/or liquid feed stream is desired.

Normally, the feed stream is gaseous when the method of the invention is part of a complete carbon dioxide production plant. A liquid feed stream will most likely be relevant when non-pure carbon dioxide is supplied from an external source and is to be further purified according to the method of the present invention.

In one embodiment it may be desirable to prepare the feed stream f so that the temperature is well above the dew point temperature of carbon dioxide at the given conditions. The pressure in the purification column will typically be around 6 to 25 bar in the food and beverage industry, such as between 15 and 23 bar, e.g. 22.8 bar. In other applications, pressures are, however, also contemplated such as up to 60 bar, e.g. 40 to 55 bar, or even higher. The dew point temperature of carbon dioxide at 10 bar is −40° C.; therefore, at that pressure the temperature of the stream entering the column should preferably be higher than this temperature.

When the appropriate pressure has been chosen it is within the skill of the art to choose the appropriate temperature of the feed stream. When the temperature of the feed stream is well above the dew point of carbon dioxide when entering the column, the amount of liquid carbon dioxide in the bottom stream is minimized.

It is also contemplated that the gaseous feed stream is cooled, and optionally liquefied before entering the purification column; in this embodiment the contaminant rich liquid stream will comprise a higher amount of carbon dioxide than when the feed stream is gaseous.

The contaminant lean gaseous stream leaving the purification column is fed to a compressor in which the difference in pressure is provided.

Figure 2:
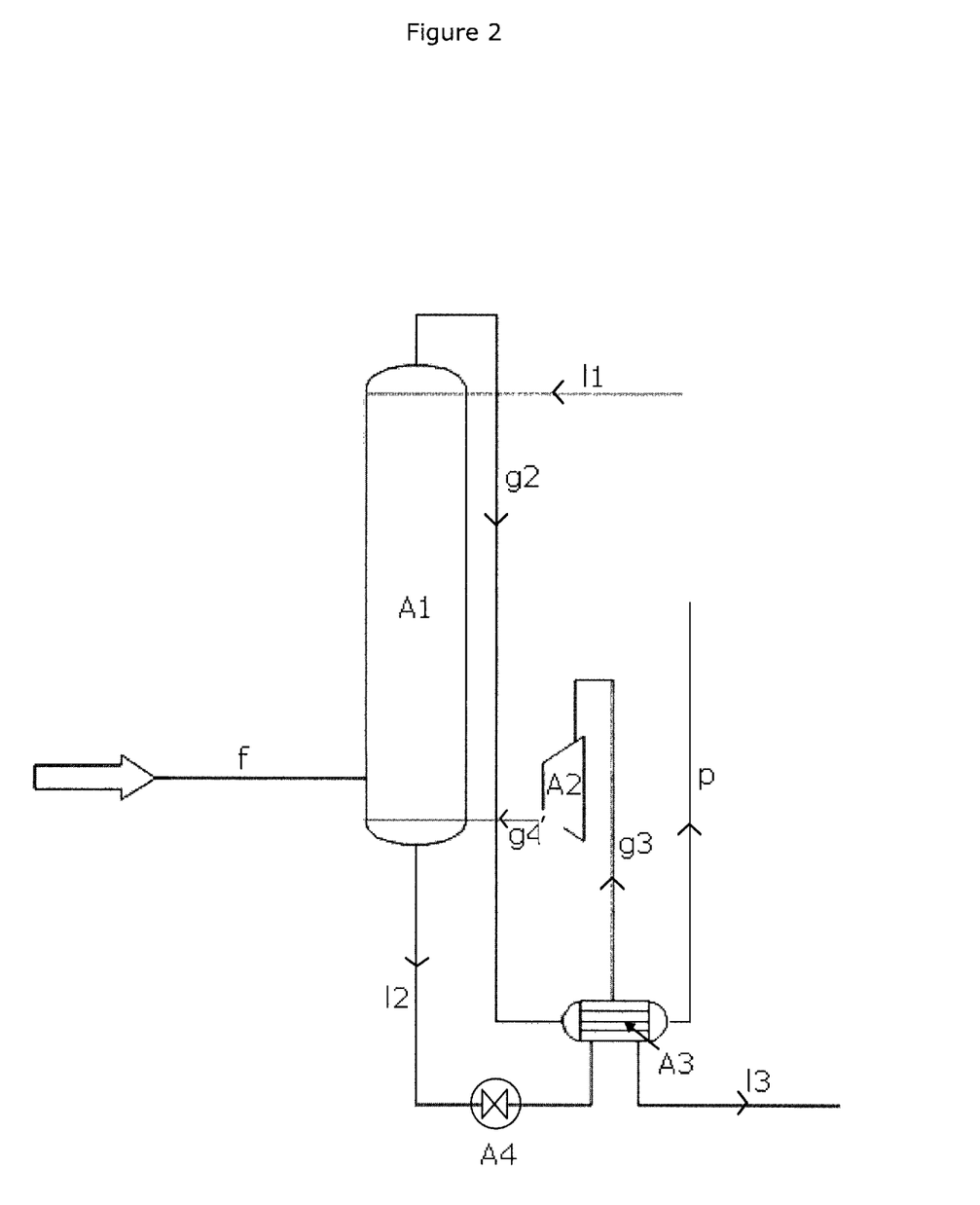
FIG. 2 is a flow chart embodying the method of the invention where the compression step/means is positioned according to alternative 2.

Referring now to FIG. 2 an embodiment of the present invention is illustrated in which the influent feed stream shown is gaseous. In FIG. 2 the denotations are the same as given in FIG. 1 it is also contemplated that the feed stream is liquid and would consequently be situated at the top section of the purification column.

In this embodiment the compressing means is situated after the reboiler so that the gaseous stream g3 is compressed before entering the purification column. In this embodiment a valve A4 is placed to depressurize the contaminant rich liquid stream 12 before entering the reboiler, providing the necessary difference in pressure. In this embodiment the duty of the compressing means may be lower as compared to the first embodiment. This is due to the lower amount of carbon dioxide passing through in the gaseous stream g3 as compared to the contaminant lean gaseous stream g2. Furthermore, a cheaper compressor may be used, e.g. an oil lubricated compressor, as the compressed gaseous stream provided, g4', is immediately purified removing any traces of oil from the stream.

Figure 3:
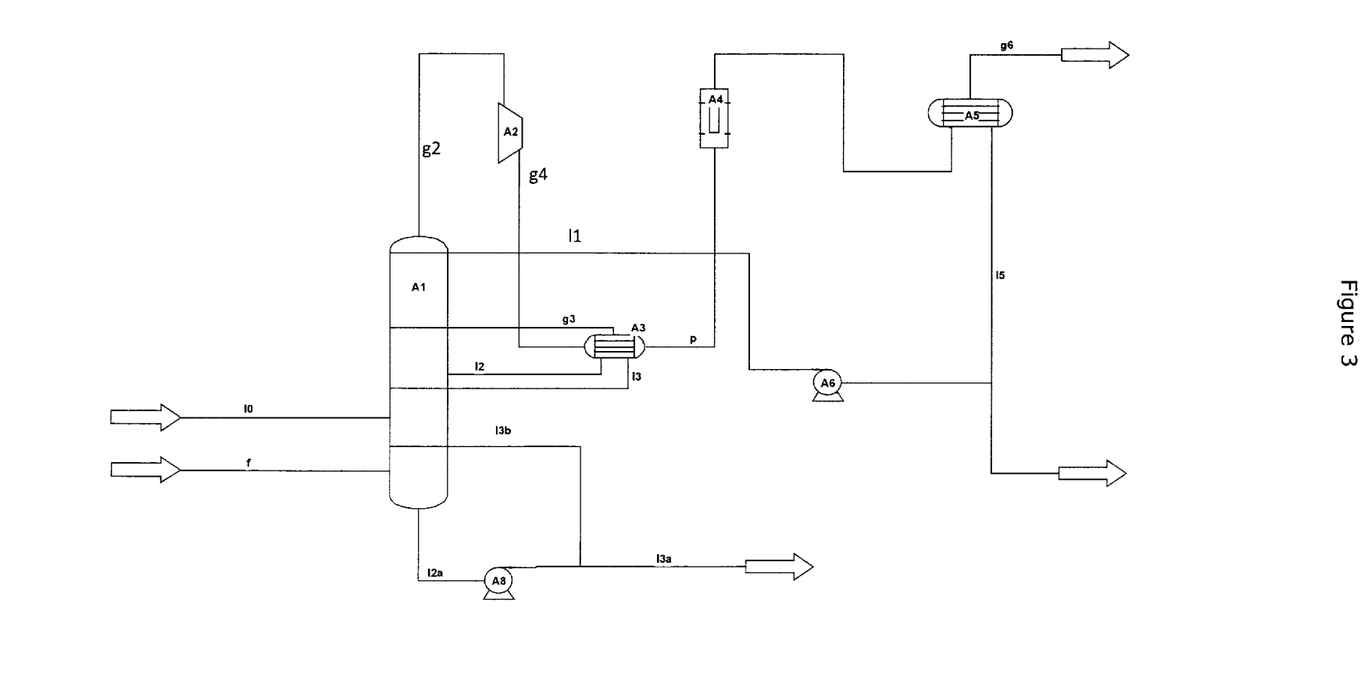
FIG. 3 is a schematic illustration of a presently preferred embodiment of alternative 1 of the carbon dioxide purification unit of the present invention in which dehydration of the stream is integrated.

Referring now to FIG. 3 an embodiment of the present invention is illustrated in which the influent feed stream is gaseous. In FIG. 3 the denotations as given in FIG. 1 are the same.

Additionally, in FIG. 3 is shown a liquid stream 10 entering the purification column for example at a position above the feeding stream f and below the mid section of the column. The stream 10 comprises the water inhibitor and/or scavenger, e.g. methanol, ethanol, monoethyleneglycol, triethylene-glycol or ammonia and is therefore a water inhibitor/scavenger feed stream. It is also contemplated that 10 is fed together with or at the same position as the feed stream f or is mixed with the feed stream f before entering the column.

When the feed stream originates from a bioethanol or fermentation plant the stream may comprise ethanol and it may not be necessary to add additional water inhibitor to the purification column. Thus, in a particular embodiment the feed stream originates from a bioethanol plant or a fermentation process and the water inhibitor is fed together with the feed stream.

In principle the water inhibitor/scavenger may be fed at any position of the column, however it is preferred that it is fed at the lower section of the column in order to minimize contamination of the contaminant lean gaseous stream g2.

In the embodiment shown the contaminant rich liquid stream 12 leaves the column at a position above the inlets of the feed stream and the water inhibitor/scavenger, respectively. In this embodiment the waste liquid stream 13 re-enters the column for use in the lower section, where it is used to scrub out impurities of the incoming gaseous streams fed to the lower part of the column A1.

In the embodiment shown a first contaminant rich liquid stream 12a is partly recirculated to the column, this recirculation may be omitted. Thus, at the bottom section of the column the first contaminant rich liquid stream 12a is withdrawn and at least a portion of the stream is fed to the purification column as a split liquid stream 13b. A second waste stream, 13a, is discarded. The split liquid stream 13b may optionally be subjected to a heat exchanging step (not shown), providing, if heated, either a gaseous stream g3a or a gas liquid mixture or, if cooled, the split liquid stream further cooled. The provision of the recirculation provides either a higher degree of purity when a liquid stream is provided, i.e. the heat exchanger cools, or a higher yield, when the heat exchanger provides heat. This set up will result in a very pure product steam p and a very low degree of waste carbon dioxide (ultimately 13a) without using excessive water inhibitor/scavenger otherwise used if the increased contact between contaminant rich and contaminant lean fluids were to be conducted at the upper part of the purification column.

In the embodiment shown the product is further purified by filtrating (A4), optionally through an activated carbon filter, liquefaction by means of a condenser (A5) and/or a distillation column (A5'—not shown) providing a condensed/distilled liquid carbon dioxide stream 16 and the stream of non-condensable gases g6.

It is also contemplated that liquid carbon dioxide may be withdrawn at a position above the inlet of the water inhibitor/scavenger and the contaminant rich liquid stream (12) outlet. This stream is denoted a carbon dioxide stream 15 (not shown) The advantage of this embodiment is that the water inhibitor/scavenger is not contaminated with an impurity from which the water inhibitor/scavenger cannot be recovered. In this embodiment the contaminant rich liquid stream is preferably situated at the lower part of the column.

In a further embodiment (not shown) the contaminant rich liquid stream 12 leaving the column is split into the streams 12a the first liquid stream and 12" a second liquid stream. 12" is fed to a second reboiler and 12a is mixed with the water inhibitor/scavenger stream 10 and re-enters the column in a mixture as the water inhibitor/scavenger. 12a comprises carbon dioxide, contaminants, water and the water inhibitor/scavenger stream. This looping of the water inhibitor/scavenger is feasible despite the fact that pure inhibitor is mixed with the first liquid stream 12a because pure inhibitor will often have a water binding capacity which exceeds the amount of water present in the feed stream f. Therefore, by looping the liquid stream 12a to the stream 10, both consumption of water inhibitor/scavenger and the volume of the first liquid stream 12a will be reduced, both resulting in overall savings. The ratio of the first liquid stream 12a that is mixed with the water inhibitor/scavenger stream 10 to the contaminant rich stream 12 depends on the water inhibitor/scavenger used. The skilled person will be able to determine the optimal ratio.

In this embodiment the second liquid stream 12" is fed to the reboiler A3 and re-evaporated and purified according to the invention.

It is, however, also contemplated by the present invention that the first liquid stream 12a is fed to the column again, optionally after being re-evaporated, i.e. the stream 12a is not mixed with 10. This embodiment may be desirable if unexpectedly large amounts of water are present in the feed stream f, or if the stream 10 is diluted beforehand so that the concentration of water inhibitor/scavenger is low.

Another situation where 12a is not mixed with 10 could be if the first liquid stream (12a) comprises contaminants which react with the water inhibitor/scavenger creating undesired side-products.

The absorbent liquid carbon dioxide may be fully or partially originating from the gaseous feed stream to be purified. This embodiment is suitable when the amount of liquid carbon dioxide to be used is relatively low, such as 400-2000 kg/hour, alternatively it can be used as a supplement to externally supplied liquid carbon dioxide, and is particularly used when the feeding stream is gaseous. In this embodiment the purification column, in which the method is taking place, is provided with a condensing means, preferably in the top section of the column. When the, preferably gaseous, carbon dioxide feed stream contacts the condensing means, a fraction of the gas will condense and, due to the higher density, run in the opposite direction than the gaseous stream and act as the absorbent/rectification liquid. This construction has several advantages; first of all, the set up is relatively simple and part of the absorbent originates from the feed stream to be purified.

The present invention will now be illustrated in more details by way of the following non-limiting example.

Comparative Example

Purification of gaseous carbon dioxide according to the method of the prior art at a constant pressure of 22.8 bar in the column, at a constant feeding gas temperature of 10.70° C. and at a constant liquid carbon dioxide temperature of −18.20° C. is illustrated in the table below with varying flow rates of the liquid absorbent carbon dioxide stream. The number given in the column TB (° C.) is the boiling point of each of the components at 1 bar(a). The loss of carbon dioxide indicated in the top row is loss without any provisions for recovery of the contaminant rich liquid stream (12).

|  |  | Carbon dioxide loss (4/hour) |  |  |  |  |  |  |  |
|---|---|---|---|---|---|---|---|---|---|
|  |  | 1562.8 | 1066.1 | 817.9 | 718.6 | 619.4 | 173.8 | 74.9 | 2.9 |
|  |  | Liquid CO$_2$ fed to column (Kg/h) |  |  |  |  |  |  |  |
| Flow rates (kmole/h) | Feed gas | 2000 | 1500 | 1250 | 1150 | 1050 | 600 | 500 | 400 |
|  |  | % Recovery to waste liquid outlet |  |  |  |  |  |  | TB ° C. |
| Nitrogen | 0.01 | 1.43 | 0.97 | 0.75 | 0.65 | 0.56 | 0.15 | 0.06 | 0.00 | −195.8 |
| Oxygen | 0.01 | 2.68 | 1.83 | 1.41 | 1.23 | 1.06 | 0.30 | 0.13 | 0.01 | −182.98 |
| Methane | 0.01 | 3.15 | 2.15 | 1.65 | 1.45 | 1.25 | 0.35 | 0.15 | 0.01 | −161.49 |
| Carbon Dioxide | 100.00 | 24.41 | 18.07 | 14.47 | 12.95 | 11.36 | 3.47 | 1.53 | 0.06 | −78.48 |
| Hydrogen Sulfide | 0.01 | 43.41 | 30.14 | 23.29 | 20.53 | 17.77 | 5.28 | 2.49 | 0.19 | −60.35 |
| Carbonyl Sulfide | 0.01 | 95.43 | 86.96 | 77.41 | 71.93 | 65.30 | 21.36 | 9.52 | 0.32 | −50.15 |
| Dimethyl Ether | 0.01 | 99.87 | 99.46 | 98.71 | 98.09 | 97.07 | 67.01 | 37.51 | 0.66 | −24.84 |
| n-Pentane | 0.01 | 99.90 | 99.60 | 99.03 | 98.55 | 97.78 | 74.15 | 49.36 | 1.81 | 36.07 |
| Nitrogen Dioxide | 0.01 | 100.00 | 100.00 | 99.99 | 99.99 | 99.98 | 99.56 | 98.04 | 2.72 | 20.85 |
| n-Hexane | 0.01 | 100.00 | 100.00 | 99.99 | 99.99 | 99.98 | 99.61 | 98.52 | 5.01 | 68.73 |
| Acetaldehyde | 0.01 | 100.00 | 100.00 | 100.00 | 100.00 | 100.00 | 99.98 | 99.89 | 4.81 | 20.85 |
| Ethyl Acetate | 0.01 | 100.00 | 100.00 | 100.00 | 100.00 | 100.00 | 99.99 | 99.98 | 61.40 | 77.06 |
| Dimethyl Sulfide | 0.01 | 100.00 | 100.00 | 100.00 | 100.00 | 100.00 | 100.00 | 99.99 | 10.61 | 37.33 |
| Benzene | 0.01 | 100.00 | 100.00 | 100.00 | 100.00 | 100.00 | 100.00 | 100.00 | 60.87 | 80.09 |
| Acetone | 0.01 | 100.00 | 100.00 | 100.00 | 100.00 | 100.00 | 100.00 | 100.00 | 69.76 | 56.25 |
| Toluene | 0.01 | 100.00 | 100.00 | 100.00 | 100.00 | 100.00 | 100.00 | 100.00 | 99.40 | 110.63 |
| Methanol | 0.01 | 100.00 | 100.00 | 100.00 | 100.00 | 100.00 | 100.00 | 100.00 | 99.71 | 64.7 |
| Ethanol | 0.01 | 100.00 | 100.00 | 100.00 | 100.00 | 100.00 | 100.00 | 100.00 | 99.88 | 78.29 |

-continued

| Flow rates (kmole/h) | Feed gas | Carbon dioxide loss (4/hour) | | | | | | | | |
|---|---|---|---|---|---|---|---|---|---|---|
| | | 1562.8 | 1066.1 | 817.9 | 718.6 | 619.4 | 173.8 | 74.9 | 2.9 | |
| | | Liquid CO$_2$ fed to column (Kg/h) | | | | | | | | |
| | | 2000 | 1500 | 1250 | 1150 | 1050 | 600 | 500 | 400 | |
| | | % Recovery to waste liquid outlet | | | | | | | | TB ° C. |
| Isobutanol | 0.01 | 100.00 | 100.00 | 100.00 | 100.00 | 100.00 | 100.00 | 100.00 | 99.99 | 107.66 |
| n-Propanol | 0.01 | 100.00 | 100.00 | 100.00 | 100.00 | 100.00 | 100.00 | 100.00 | 100.00 | 97.2 |
| Feed gas temp ° C. | 10.70 | | | | | | | | | |
| Gas Outlet temp ° C. | | −19.01 | −19.01 | −19.00 | −19.01 | −19.00 | −18.97 | −18.95 | −17.68 | |
| Liquid Feed temp. ° C. | −18.20 | | | | | | | | | |
| Liquid outlet temp. ° C. | | −18.83 | −18.75 | 18.74 | −18.75 | −18.57 | −17.66 | −16.28 | 5.24 | |
| Liquid outlet flow of CO$_2$. kmole/hr | | 35.51 | 24.22 | 18.58 | 16.33 | 14.07 | 3.95 | 1.70 | 0.07 | |
| % CO$_2$ loss of liquid inlet$^a$ | | 78.14 | 71.07 | 65.43 | 62.49 | 58.99 | 28.96 | 14.97 | 0.74 | |
| % CO$_2$ loss of total CO$_2$ amount$^b$ | | 24.41 | 18.07 | 14.47 | 12.95 | 11.36 | 3.47 | 1.53 | 0.06 | |

$^a$The percentage CO$_2$ loss of liquid inlet is calculated as the molar flow of liquid CO$_2$ leaving the column divided by the kg CO$_2$ fed to the column divided by the molar mass of CO$_2$ (i.e. 44 g/mole) and multiplied by 100.
$^b$The percentage CO$_2$ loss of total CO$_2$ amount is calculated as the molar flow of liquid CO$_2$ leaving the column divided by the sum of the gas and liquid inlet (kg liquid CO$_2$ divided by 44 kmole gas) and multiplied by 100.
The percentage The feed stream f was fed at the bottom of the purification column A1 at a flow of approximately 100 kmole/hour. The major component was carbon dioxide contaminated with minor amounts of the components as indicated in the table.

The liquid absorbent carbon dioxide stream 10 was fed at the top of the purification column at different flow rates in the range 400-2000 kg/hour as indicated in the table above.

The contaminant rich liquid 12 left the purification column at the bottom section and was discarded or re-boiled according to the prior art method and fed to the gaseous feed stream again and fed to the purification column.

The contaminant lean carbon dioxide enriched stream leaving the column at the top section was stored or further processed before being stored, e.g. by filtration and distillation.

From the table it is evident that under the above conditions the lowest applicable flow rate of liquid carbon dioxide was approximately 400 kg/hour. At this flow rate only n-propane was completely reduced; toluene, methanol, ethanol and iso-butanol to over 99%.

Increasing flow rates increased the number of components that were washed out. Thus, depending on the composition of the feed gas the flow rate must be adjusted for optimal results. In the top row the amount of carbon dioxide waste is illustrated. Thus, it can be seen that increasing the flow of liquid carbon dioxide effectuated a more efficient washing out of contaminants, however the amount of waste carbon dioxide in the contaminant rich stream increased dramatically from 1.53% at 500 kg/hour to 24.41% at 2000 kg/hour. Though not shown, increasing the amount of liquid carbon dioxide above 2000 kg/hour would result in even higher percentages of carbon dioxide in the contaminant rich fraction.

Recirculating this contaminant rich carbon dioxide by means of a reboiler as suggested in the prior art would require a large energy input as outlined in table 3 below.

Example 1

A feed stream was treated according to the method described in the comparative example. In addition a blower, i.e. compressing means, was inserted in accordance with alternative 1 according to the present invention.

TABLE 2

| | | Absorbent liquid carbon dioxide fed to column (kg/hour) | | | | | | | |
|---|---|---|---|---|---|---|---|---|---|
| Pressure in column bar 22.8 | | 12,000 | 10,500 | 9000 | 7500 | 6000 | 4500 | 3000 | 1500 |
| Flowrates in feed gas (kmole/hour) | | % Recovery to liquid outlet | | | | | | | |
| Nitrogen | 0.01 | 0.00 | 0.00 | 0.00 | 0.00 | 0.00 | 0.00 | 0.00 | 0.00 |
| Oxygen | 0.01 | 0.01 | 0.01 | 0.01 | 0.01 | 0.01 | 0.01 | 0.01 | 0.01 |
| Methane | 0.01 | 0.01 | 0.01 | 0.01 | 0.01 | 0.01 | 0.01 | 0.01 | 0.02 |
| Carbon Dioxide | 100.00 | 0.67 | 0.74 | 0.80 | 0.82 | 0.92 | 1.05 | 1.23 | 1.46 | 1.76 |
| Hydrogen Sulfide | 0.01 | 1.53 | 1.62 | 1.72 | 1.85 | 2.00 | 2.20 | 2.52 | 2.98 |
| Carbonyl Sulfide | 0.01 | 89.39 | 89.03 | 88.37 | 87.43 | 85.16 | 80.73 | 70.44 | 42.99 |
| Dimethyl Ether | 0.01 | 99.95 | 99.95 | 99.94 | 99.91 | 99.91 | 99.86 | 99.72 | 98.81 |
| N-Pentane | 0.01 | 99.97 | 99.97 | 99.96 | 99.94 | 99.94 | 99.92 | 99.83 | 99.30 |
| Nitrogen Dioxide | 0.01 | 100.00 | 100.00 | 100.00 | 100.00 | 100.00 | 100.00 | 100.00 | 100.00 |
| N-Hexane | 0.01 | 100.00 | 100.00 | 100.00 | 100.00 | 100.00 | 100.00 | 100.00 | 100.00 |
| Acetaldehyde | 0.01 | 100.00 | 100.00 | 100.00 | 100.00 | 100.00 | 100.00 | 100.00 | 100.00 |
| Ethyl Acetate | 0.01 | 100.00 | 100.00 | 100.00 | 100.00 | 100.00 | 100.00 | 100.00 | 100.00 |
| Dimethyl Sulfide | 0.01 | 100.00 | 100.00 | 100.00 | 100.00 | 100.00 | 100.00 | 100.00 | 100.00 |
| Benzene | 0.01 | 100.00 | 100.00 | 100.00 | 100.00 | 100.00 | 100.00 | 100.00 | 100.00 |
| Acetone | 0.01 | 100.00 | 100.00 | 100.00 | 100.00 | 100.00 | 100.00 | 100.00 | 100.00 |
| Toluene | 0.01 | 100.00 | 100.00 | 100.00 | 100.00 | 100.00 | 100.00 | 100.00 | 100.00 |
| Methanol | 0.01 | 100.00 | 100.00 | 100.00 | 100.00 | 100.00 | 100.00 | 100.00 | 100.00 |

TABLE 2-continued

| | | Absorbent liquid carbon dioxide fed to column (kg/hour) | | | | | | | |
|---|---|---|---|---|---|---|---|---|---|
| Pressure in column bar 22.8 | | 12,000 | 10,500 | 9000 | 7500 | 6000 | 4500 | 3000 | 1500 |
| Flowrates in feed gas (kmole/hour) | | % Recovery to liquid outlet | | | | | | | |
| Ethanol | 0.01 | 100.00 | 100.00 | 100.00 | 100.00 | 100.00 | 100.00 | 100.00 | 100.00 |
| Isobutanol | 0.01 | 100.00 | 100.00 | 100.00 | 100.00 | 100.00 | 100.00 | 100.00 | 100.00 |
| N-Propanol | 0.01 | 100.00 | 100.00 | 100.00 | 100.00 | 100.00 | 100.00 | 100.00 | 100.00 |
| Feed gas temp ° C. | 10.70 | | | | | | | | |
| Gas Outlet temp ° C. | | −19.0 | −19.0 | −19.0 | −19.0 | −19.0 | −19.0 | −19.0 | −19.0 |
| Liquid Feed temp. ° C. | −18.20 | −22.0 | −22.0 | −22.0 | −22.0 | −22.0 | −22.0 | −22.0 | −22.0 |
| Liquid outlet temp. ° C. | | 18.74 | −18.75 | −18.57 | −17.66 | −16.28 | | | 5.24 |

From table 2 it can be seen that the amount of carbon dioxide in the overall process was substantially reduced as compared to the comparative example for which the results are shown in table 1. Thus, the waste liquid (13) comprised only minor volumes of carbon dioxide.

The energy consumption that would be required by the prior art method and the method of the present invention respectively has been compared.

In a recovery unit of the size illustrated, i.e. processing 100 kmole feed gas per hour, approximately 30 kWh internal energy is available ("internal energy" means energy that is neutral to the refrigeration load). The internal energy available will increase with the size of the unit.

In table 3 below the energy consumption is analysed. In a plant operating at 100 kmole feed stream/hour the internal heat available typically corresponds to 30 kWh. "Additional power prior art" in table 3 is the extra power required in order to reduce the $CO_2$ loss to the same level as for the present invention. Heat required above this value must be supplied from external sources.

TABLE 3

| | Absorbent liquid carbon dioxide (kg/hour) | | | | | | | |
|---|---|---|---|---|---|---|---|---|
| | 12,000 | 10,500 | 9,000 | 7,500 | 6,000 | 4,500 | 3,000 | 1,500 |
| Reboiler duty (kWh) | 881.2 | 765.3 | 649.5 | 533.6 | 417.7 | 301.8 | 186.0 | 70.4 |
| Additional power prior art (kWh) | 425.61 | 3676.7 | 309.73 | 251.78 | 193.84 | 135.90 | 78.00 | 20.22 |
| Additional power for refrigeration (kWh) | 12.3 | 10.7 | 9.0 | 7.4 | 5.8 | 4.2 | 2.6 | 1.0 |
| Additional power for blower (kWh) | 24.5 | 21.3 | 18.1 | 14.9 | 11.6 | 8.4 | 5.2 | 2.0 |
| Total additional power present invention (kWh) | 36.8 | 32.0 | 27.1 | 22.3 | 17.5 | 12.6 | 7.8 | 3.0 |

From the table it is clearly seen that when applying the solution provided by the present invention the overall energy needed for providing a clean product stream without compromising the yield of carbon dioxide is markedly reduced.

What is claimed is:

1. A carbon dioxide purification system, comprising:
    a purification column having a top with an outlet and a bottom;
    a reboiler in fluid communication with the outlet of the top of the purification column via a first pathway consisting of one or more pipes that carry a contaminant lean gaseous stream;
    a compressor in fluid communication with the reboiler and the purification column, wherein the compressor is provided downstream of the reboiler;
    a depressurizing valve in fluid communication with the bottom of the purification column and the reboiler; and
    a product line in fluid communication with the reboiler.

2. The carbon dioxide purification system of claim 1, the purification column defining:
    a bottom outlet at the bottom;
    a feed inlet between the top and the bottom; and
    a compression inlet between the feed inlet and the bottom.

3. The carbon dioxide purification system of claim 2, wherein:
    the compressor is in fluid communication with the purification column via the compression inlet; and
    the depressurizing valve is in fluid communication with the bottom of the purification column via the bottom outlet.

4. The carbon dioxide purification system of claim 1, wherein the depressurizing valve is in fluid communication with the compressor via the reboiler.

5. The carbon dioxide purification system of claim 1, wherein the purification column is in fluid communication with the product line via the reboiler.

6. The carbon dioxide purification system of claim 1, wherein the reboiler defines a first fluid flow path and a second fluid flow path, the first and second fluid flow paths being fluidly isolated from one another.

7. The carbon dioxide purification system of claim 6, wherein the first and second fluid flow paths are arranged to exchange heat with one another.

8. The carbon dioxide purification system of claim 6, wherein
    the top of the purification column and the product line are in fluid communication with the first fluid flow path; and
    the depressurizing valve and the compressor are in fluid communication with the second flow path.

9. The carbon dioxide purification system of claim 8, wherein fluid from a bottom cools fluid from the top in the reboiler.

10. The carbon dioxide purification system of claim 1, wherein the depressurizing valve is provided upstream of the reboiler.

11. A carbon dioxide purification system, consisting essentially of:
- a reboiler;
- a purification column having a top and a bottom;
- a compressor;
- a product line;
- a plurality of pipes; and
- optionally, one or more pumps, valves and combinations thereof;
- wherein a first fluid flow path consists essentially of the purification column, the reboiler, pipes and, optionally, the one or more pumps, valves and combinations thereof and a second fluid flow path consists essentially of the purification column, the reboiler, the compressor, pipes and, optionally, the one or more pumps, valves and combinations thereof,
- wherein the top of the purification column is in fluid communication with the first fluid flow path and the bottom of the purification column is in fluid communication with the second fluid flow path,
- wherein the compressor is downstream of the reboiler, and
- wherein the first and second fluid flow paths are fluidly isolated from each other and in a heat exchange relationship with each other.

12. The carbon dioxide purification system of claim 11, wherein the purification column defines
- a feed inlet between the top and the bottom; and
- a compression inlet between the feed inlet and the bottom.

13. The carbon dioxide purification system of claim 11, wherein the compressor is designed to produce a pressure differential between the purification column and the reboiler.

14. The carbon dioxide purification system of claim 13, wherein a first fluid pressure in the purification column is greater than a second fluid pressure in the second fluid flow path.

15. The carbon dioxide purification system of claim 14, wherein the compressor acts to draw fluid from the bottom through the second flow path.

16. The carbon dioxide purification system of claim 11, wherein fluid in the second flow path cools fluid in the first flow path.

17. A method for producing purified carbon dioxide, the method comprising:
- feeding a first unpurified stream of carbon dioxide into a purification column having a top and a bottom;
- circulating a second unpurified stream of carbon dioxide from the bottom through a first fluid flow path consisting of the purification column, a reboiler heat exchanger, a compressor, pipes, and, optionally, one or more pumps, valves, and combinations thereof, wherein the compressor is downstream of the reboiler; and
- passing a purified stream of carbon dioxide from the top through a second fluid flow path consisting of the purification column, the reboiler heat exchanger, pipes, and, optionally, one or more pumps, valves, and combinations thereof, wherein the first and second fluid flow paths are fluidly isolated from one another and exchange heat with one another;
- wherein circulating the second unpurified stream of carbon dioxide from the bottom through the first fluid flow path of the reboiler heat exchanger comprises compressing the second unpurified stream of carbon dioxide downstream of the reboiler heat exchanger.

* * * * *